Patented Oct. 28, 1941

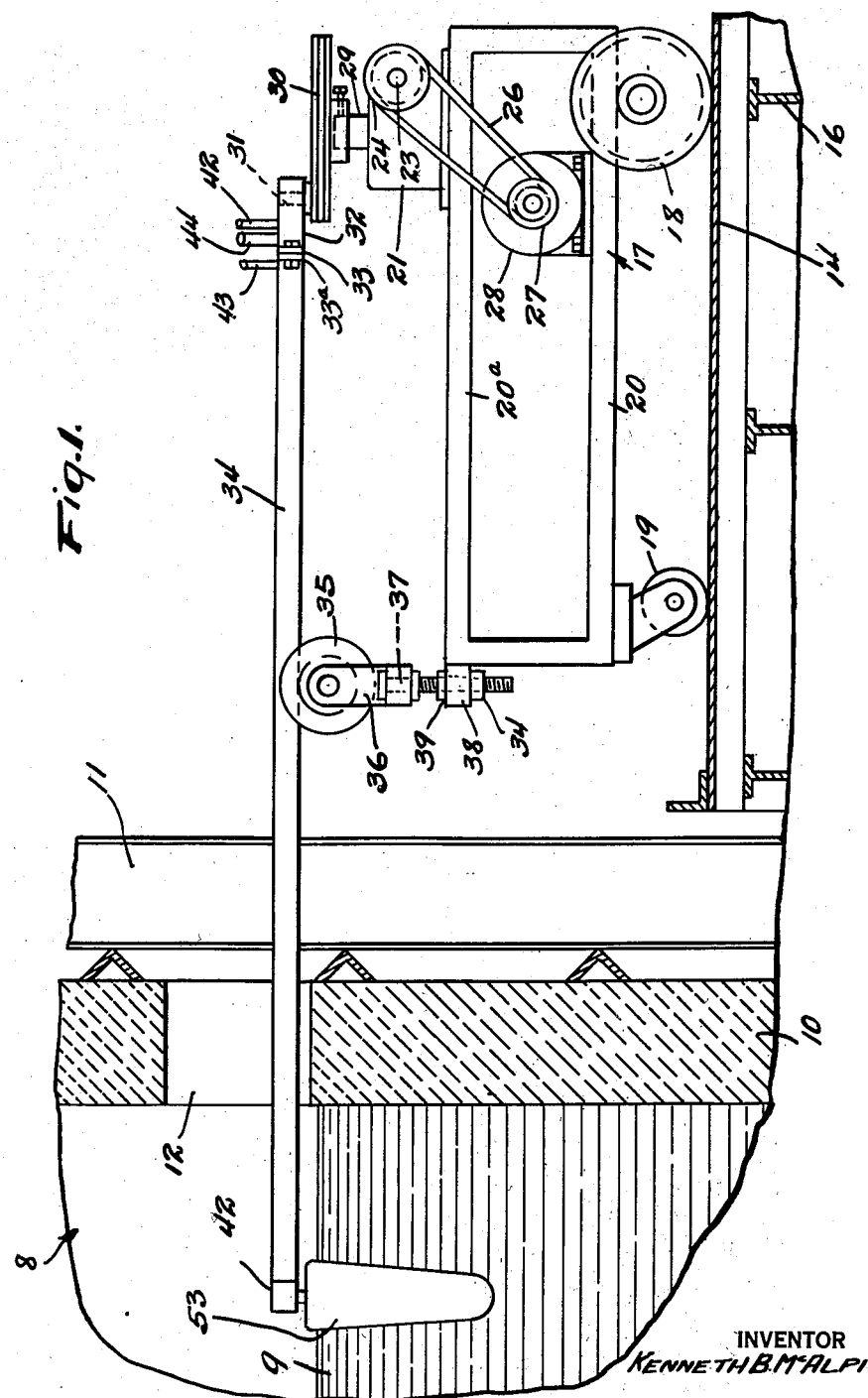

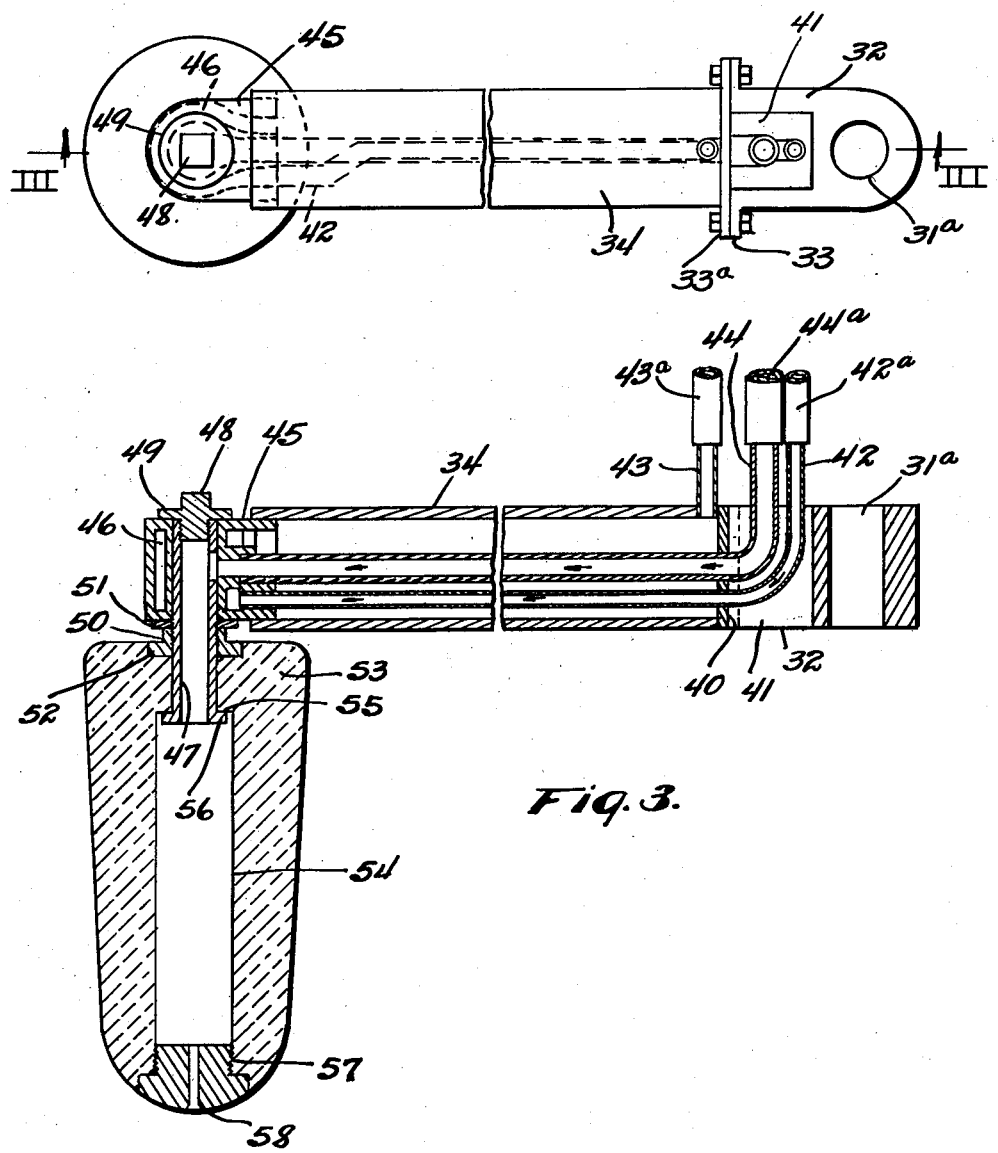

2,261,034

UNITED STATES PATENT OFFICE 2,261,034

APPARATUS FOR FINING MOLTEN GLASS

Kenneth B. McAlpine, Pittsburgh, Pa., assignor to Pittsburgh Plate Glass Company, Allegheny County, Pa., a corporation of Pennsylvania Application April 27, 1940, Serial No. 332,021

2 Claims. (Cl. 259—126)

The present invention relates to a process of and apparatus for removing small seeds and bubbles of gas from a body of molten glass, and it has particular relation to a process of and apparatus for removing such bubbles by passing relatively large bubbles of gas, such as carbon monoxide, through molten glass in such manner as to collect the fine and difficultly removable "seed" bubbles and gases absorbed in the glass.

One object of the invention is to provide a process and apparatus of the foregoing type by application of which a body of molten glass in a tank or pot can be subjected to uniform and thorough treatment with bubbles of gas.

In the manufacture of glass, a mixture of sand, lime and soda ash is customarily heated to a relatively high temperature in order to fuse down the various ingredients into a homogeneous mass. Since soda ash and lime are decomposed by the heat to liberate carbon dioxide gas, and also, since there are certain amounts of water vapors present in the material employed in formulating the glass batch, large volumes of gases and vapors are liberated during the heating operation and produces much bubbling and boiling of the freshly formed molten glass. Since the latter is relatively viscous, it is difficult completely to remove all of the bubbles and notably the smaller ones. These tend to remain permanently in the glass and of course are highly objectionable in the finished product, particularly where the product is used for optical purposes, or for the manufacture of mirrors and the like.

Furthermore, the molten glass appears to be supersaturated with certain gases, such as carbon dioxide. As the melt cools these separate to form seeds which, because of the viscosity of the partially cooled glass, can not escape.

In order to eliminate insofar as possible the seeds from a glass batch it is conventional practice to introduce into the batch in the pot or tank organic materials designed to produce large amounts of gas and vapors. For example, potatoes or the like are sometimes thrown into the pot and by reason of generation of steam and carbon dioxide beneath the surface of the glass large bubbles are formed and these tend to collect the smaller bubbles as they pass through the molten glass. Since they are of considerable size the large bubbles are able to make their way through the surface and escape. Such process obviously is by no means satisfactory because it is difficult to obtain uniform and thorough sweeping or fining of all portions of the glass by such method. Furthermore, gas producing bodies when first thrown into the molten glass generate gases and vapors with such violence as to produce excessive ebullition of over-size bubbles. Such action is likely to cause entrapment of small air bubbles in the mass, thus tending to defeat the object of this treatment. However, within a short time this ebullition dies down and even ceases altogether.

In accordance with the provisions of the present invention a stream of gas is introduced below the surface of the body of molten glass in a tank pot or the like by means of a nozzle or jet which is provided with means whereby it can be moved about through the molten bath, in such manner as to produce relatively uniform treatment of all portions thereof.

For a better understanding of the invention reference may now be had to the accompanying drawings in which Figure 1 is a fragmentary cross-sectional view illustrating a portion of a tank pot for molten glass and a suitable bubbling apparatus constituted in accordance with the provision of the present invention.

Figure 2 is a detail view of a stirring arm adapted for use in the practice of the invention.

Figure 3 is a cross-sectional view substantially upon the line III—III of Fig. 2.

In the drawings like numerals refer to like parts throughout.

The apparatus as shown includes a pot, tank, or other container 8 for molten glass 9, and having a side wall 10 formed of a conventional refractory material. This wall may be reinforced by suitable metal frame elements 11 and is also provided with an opening 12 for a purpose which is to be described.

The apparatus for introducing bubbles of gas into the molten glass includes a platform 14 supported by framework 16, which platform is designed to support a movable carriage 17 having rear wheels 18 and caster-like front wheels 19. The carriage has a lower deck 20 and an upper deck 20a, the latter of which supports a speed-reducing gear mechanism 21, which in turn is actuated by horizontal shaft 23 having a drive pulley or sprocket 24. The latter is actuated by means of a suitable belt or sprocket chain 26 which is trained about pulley 27 of a motor 28, supported upon lower deck 20 of carriage 17.

Driven shaft 29 projects vertically from the upper extremity of the shaft and is provided with a disk 30 carrying adjacent to its outer periphery a vertical pin 31, which is journaled in a bearing 31a, in block 32, having flanges 33 secured to mating flanges 33a upon an arm or pitman rod 34, which, as shown, projects through opening 12 into the pot or tank 8. The arm, intermediate of its length, is supported for combined rotation and sliding movement upon a pulley 35, which is journaled in a fork 36 upon a pintle 37. The pintle extends through an opening in a bracket 38, upon the forward end of carriage 17. Lock nuts 39, threaded upon it, hold it in any desired position of adjustment.

The arm is tubular and its rear end is closed by wall 40. A slot 41 is also formed in bearing 32 and receives a conduit 42 which projects forwardly through wall 40 to supply cooling fluid, such as water to the arm. A second conduit 43 extends through the arm adjacent to the rear extremity thereof and provides a discharge for spent fluid. A conduit 44 for gas such as carbon monoxide, also, extends through wall 40. Conduits 42, 43 and 44, it will be noted, are provided at their rear extremities with flexible connections 42a, 43a and 44a, which admit of oscillation of the arm while flow of fluids is maintained. The first connection extends to a suitable source of cooling fluid, while the second extends to a suitable point of outlet for the used cooling fluid. The third of course is connected to a suitable source of gaseous medium.

At its forward extremity, rod or arm 34 is provided with a plug-like head 45 providing a socket through which conduit 44 projects. The socket portion is also provided with a circumferentially-extending channel 46 communicating at one extremity with conduit 42 and at the other extremity communicating with the interior of the arm 34. This channel admits of circulation of the cooling medium in head 45, to prevent the latter from overheating.

Tubular shaft 47 disposed within the socket communicates with conduit 44 and is provided at its upper extremity with a plug 48 having a peripheral flange 49 engaging the upper face of the socket. A collar 50 is also threaded upon the shaft and engages a washer 51 to clamp the lower face of the socket.

A flange 52 about the collar is suitably embedded in a socket formed in the upper extremity of a suitable distributor nozzle 53. This nozzle may be formed of any suitable material of sufficiently great resistance to the heat and chemical action of molten glass. For example, it may be formed of ordinary refractories, such as is employed in the fabrication of tanks and pots used as receptacles or containers for molten glass. It may also be formed of highly resistant steel or other resistant metal. The nozzle is axially bored as indicated at 54, and the bore at its upper extremity is provided with a shoulder or internal flange 55, defining an opening through which extends the hollow shaft 47. The latter is provided at its lower extremity with a circumferential flange 56 engaging the flange of the bore to mainain the nozzle in position. At its lower extremity the bore is threaded to receive a plug-like tip 57, which may be formed of highly heat-resistant steel or other material such as platinum, tungsten, or the like and is bored with one or a plurality of small openings 58, permitting discharge of the gases into molten glass 9.

In the operation of the apparatus the carriage 17 is moved up adjacent to the tank wall 10 in such position that the arm 34 will project into and through the opening 12 and the nozzle 53 will extend downwardly into the bath of molten glass. The flow of cooling fluid through the conduits 42 and 43 is then started and likewise the flow of fining gases, such as carbon monoxide through the conduit 44 is initiated. The motor 28 is actuated to drive the belt or chain 26, the gearing 21 and the disk 30. As the disk rotates the rear extremity of the arm 34 describes a circle and correspondingly motion is communicated to the forward end of the arm 34 within the furnace. At the same time the arm rolls on the surface of roller 35 and the fork 36 supporting the latter oscillates upon pintle 37 to maintain the arm and the roller in the same plane. By thus moving the arm 34 during the period of introducing the gases into the molten pool of glass, relatively uniform distribution of the bubbles of gas throughout the molten material is attained. Effective but gentle bubbling action in all portions of the glass is thus assured. Also the rate of introduction can be maintained uniformly at the desired point for maximum degasification of the material within a minimum of time and can be controlled at will to meet any conditions.

It has been found that bubbles of gas introduced into the melt serve as centers for the precipitation of this excess gas. This gas may be an inert one, such as nitrogen, or a chemically reactive one, such as carbon monoxide.

Were gas bubbled into the melt through a stationary orifice, then, to achieve a given degree of agitation, a rapid stream would have to be used. Observation of a rapid stream of bubbles emerging from such an orifice and rising through a liquid reveals a number of small bubbles following in the wake of each larger one. These small bubbles rise slowly and may be carried around by convection currents for some time before they reach the surface of the melt. Frequent coalescence of the larger ones takes place and the resulting still larger ones rise and burst more violently at the surface. This increases the chance of air entrapment by splashing.

The introduction of gas from a moving orifice would avoid to a large extent the troubles arising from coalescence of large bubbles and would permit the use of a slower stream of gas to achieve the same degree of agitation. No definite recommendations of bubble size can be given, but preferably they should be of such a size—say 0.5 inch in diameter—that they rise fairly rapidly, and the stirring rod should not move at such a rate that rising bubbles are unduly broken up by impact with it.

The gaseous medium used preferably is carbon monoxide because the latter is particularly useful in removing water vapors from the glass. These can not be satisfactorily removed by ordinary gases. The carbon monoxide is simply bubbled in until a brownish color is produced in the glass. Air may then be bubbled in until the color is removed.

A form of the invention herein shown and described is to be considered merely exemplary, and it will be apparent that numerous modifications may be made therein without departure from the spirit of the invention or the scope of the claims.

What I claim is:

1. A combined nozzle and stirring head for simultaneously agitating and blowing with gases a body of molten glass in a container, said device comprising a nozzled body of refractory material having a vertical bore formed therein, the upper portion of the bore being formed with a peripheral shoulder having upper and lower faces, a tubular shaft extending downwardly into the bore and being provided at its lower extremity with a flange engaging the lower face of the shoulder, a collar threaded upon the tubular shaft and engaging the upper face of the shoulder to clamp the latter, the bore being further connected to a conduit for supplying a gas thereto, the lower extremity of the bore in the body being provided with a perforated plug for the admission of gas into the molten glass.

2. A construction as defined in claim 1 in which the upper extremity of the tubular shaft is surrounded by a jacket and the jacket is further connected to conduit means for supplying a cooling medium thereto.

KENNETH B. McALPINE.